Sept. 1, 1942. R. F. NORRIS ET AL 2,294,478
METHOD AND APPARATUS FOR EXPANDING SHEET MATERIAL
Filed Nov. 30, 1939 4 Sheets-Sheet 1

Inventors:
Ralph F. Norris and
George H. Nelson
By: Jesch and Darbo
Attys.

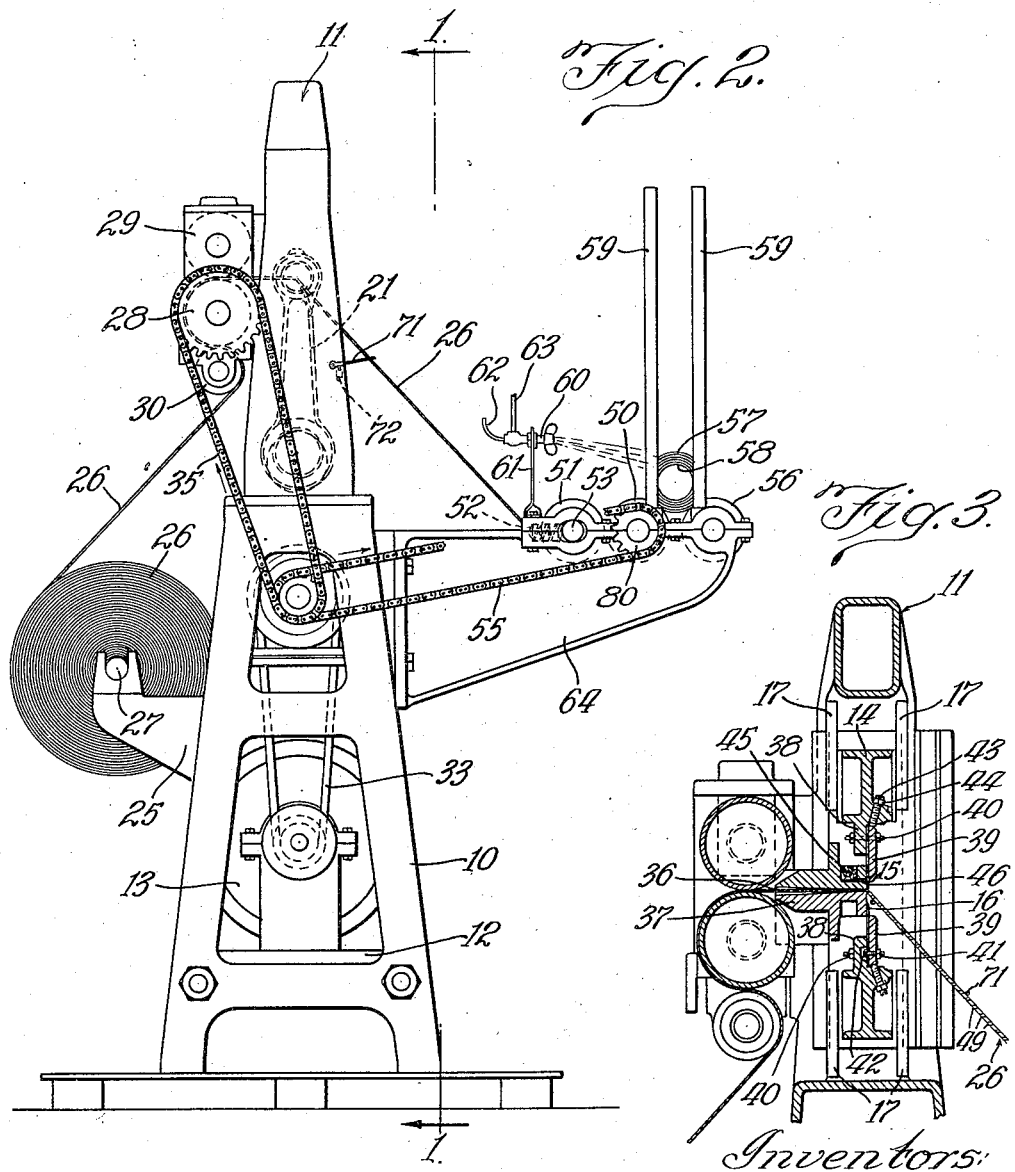

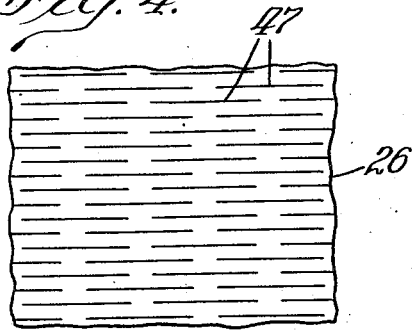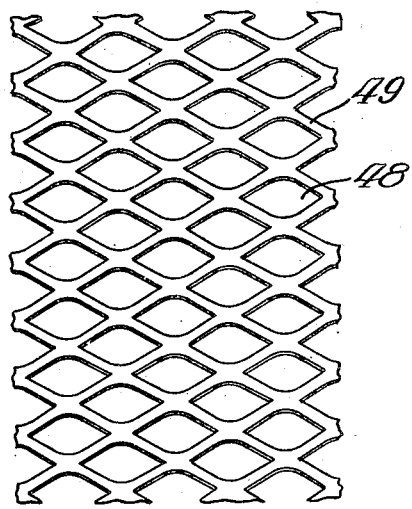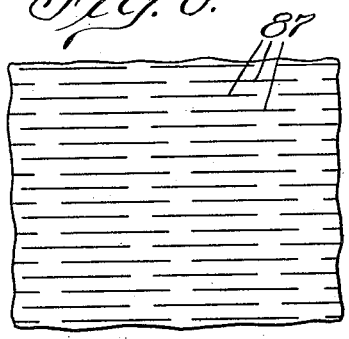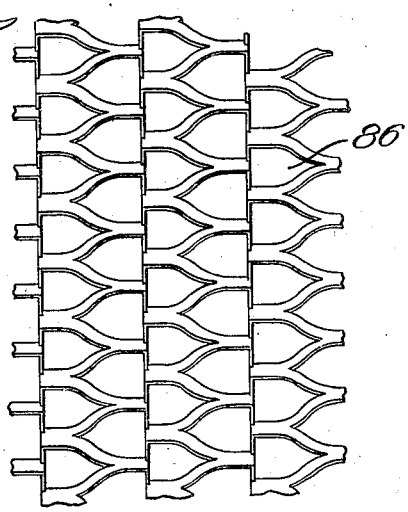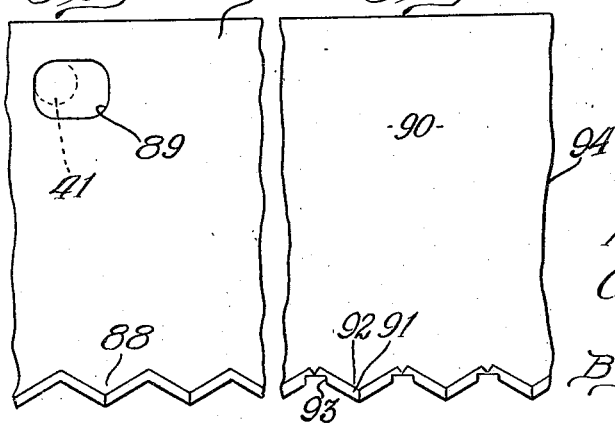

Sept. 1, 1942.  R. F. NORRIS ET AL  2,294,478
METHOD AND APPARATUS FOR EXPANDING SHEET MATERIAL
Filed Nov. 30, 1939  4 Sheets-Sheet 4

Inventors:
Ralph F. Norris and
George H. Nelson
By: Jesch and Darbo
Attys.

Patented Sept. 1, 1942

2,294,478

UNITED STATES PATENT OFFICE 2,294,478

METHOD AND APPARATUS FOR EXPANDING SHEET MATERIAL

Ralph F. Norris, Madison, Wis., and George H. Nelson, Chicago, Ill., assignors to Research Products Corporation, Madison, Wis., a corporation of Wisconsin Application November 30, 1939, Serial No. 306,854

23 Claims. (Cl. 93—1)

This invention relates to the making of expanded sheet material, and particularly expanded thin flexible sheet material which, in the slitted conditon, is readily susceptible of being stretched into expanded condition by a stretching operation applied to the sheet material as a whole. Examples of suitable sheet materials are fibrous sheet material, such as paper, asbestos, cloth, etc., thin sheet metal, such as metal foil, etc., sheets of condensation resin, such as thermoplastic resins or the resin known as Bakelite; regenerated cellulose, rubber and rubberized sheets, and other composition sheets. A specific example of the expanded product is the expanded fibrous sheet material which is arranged in superposed layers to form the air and gas filter disclosed and claimed in Walton United States Patent 2,070,073.

It is the object of the invention to provide a method and an apparatus for slitting and expanding such sheet material which is simple, economical, reliable and capable of a large output.

It is a further object of the invention to provide a machine into which the unslitted sheet material is fed continuously and from which the final slitted and expanded product is delivered continuously in condition ready for use.

It is a further object of the invention to provide a machine of the above character which is flexible in operation and capable of producing varying types of expansion, both as to pattern or shape of openings, and as to size of openings and intervening webs. It is a further object of the invention to provide a method and machine in which the orientation of the webs is uniform in the expanded product.

It is a still further object of the invention to provide a machine and method which is capable of slitting and expanding a number of sheets simultaneously and controlling the expansion of each sheet separately.

Briefly, the invention provides a method and machine in which the sheet material, in strip form, is fed forwardly through a slot, and during its passage through the slot is subjected to the action of a pair of reciprocating cutter blades, the blades operating alternately upon opposite sides of the strip, or strips, as it emerges from the slot. From this point, the slitted strip is drawn forwardly at an advanced rate by means of pull rolls to expand and open the sheet material at the slits, the strip being drawn at a substantial angle to the plane it is in as it passes through the slot. This is done to insure that the orientation of the webs is uniform in the expanded sheet and that some webs are not oriented in one direction and others in the opposite direction. If the sheet material is paper or other fibrous material possessing considerable resilience, it may be sprayed with moisture, steamed, or otherwise treated while in the expanded condition, to set the material in such condition. With some of the sheet materials, as the resins, it may be desirable to heat the material prior to the expanding operation.

In the drawings:

Fig. 2 is a view of the complete slitting and expanding machine in side elevation;

Fig. 3 is a sectional view of the sheet slitting portion of the machine on an enlarged scale;

Figs. 4 and 6 are fragmental views of the slitted sheet material showing different patterns of slitting;

Figs. 5 and 7 are fragmental views of the expanded sheet material showing the result of expanding the slitted patterns of Figs. 4 and 6, respectively;

Figs. 8 and 9 are fragmental views of the reciprocating cutter blade, showing different modifications of the same;

Figure 1:
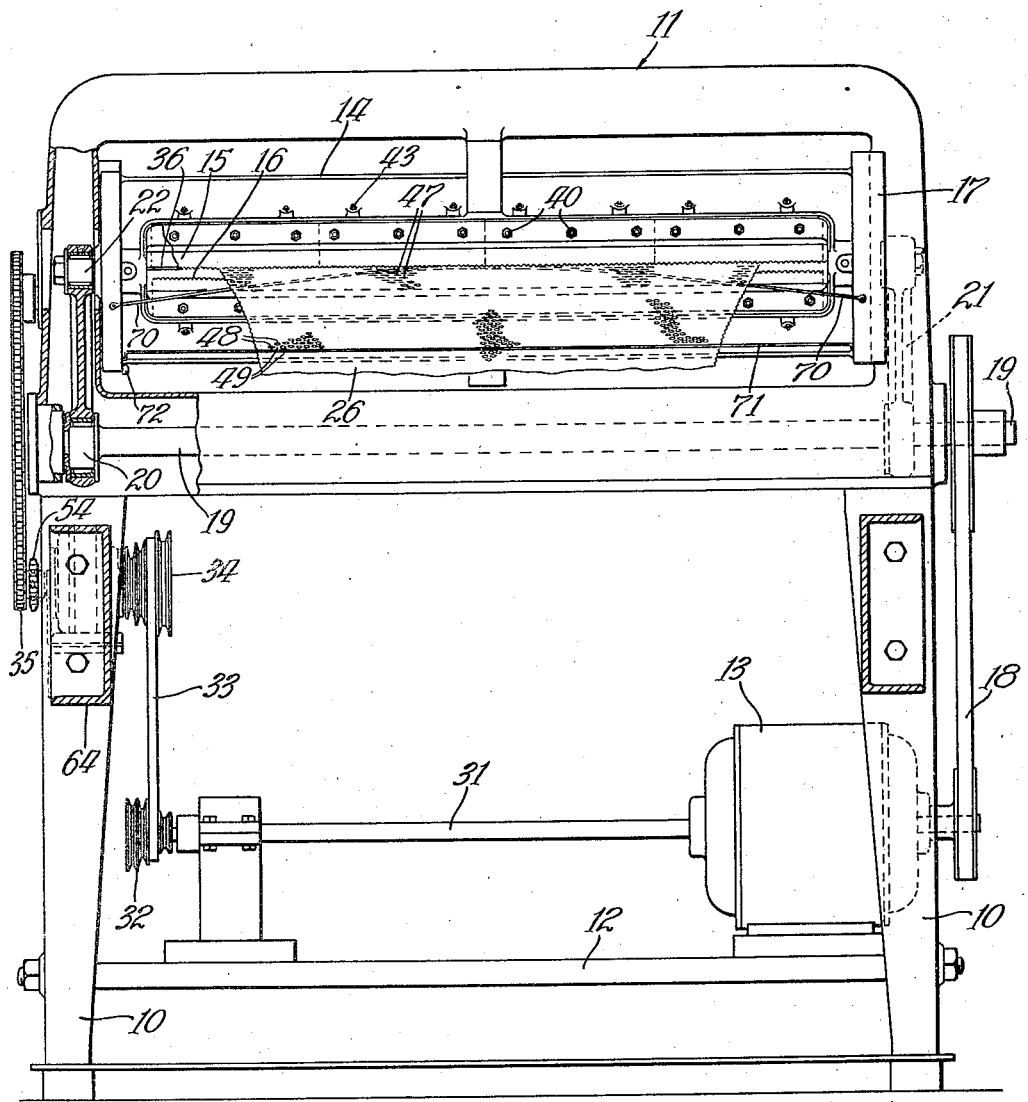
Fig. 1 is a front elevational view, partly in section, of the sheet slitting portion of the machine.

As illustrated in Figs. 1, 2 and 3, the machine comprises a frame having a supporting base 10, and a hollow head 11 mounted upon the top of the base. The base 10, at its lower portion carries a platform 12 for a source of motive power, which is indicated as being an electric motor 13. Upon the head 11, a cutter 14 is mounted for vertical reciprocation. The cutter carries a pair of spaced-apart oppositely disposed blades 15 and 16. See Fig. 8 for an enlarged view of a cutter blade.

The cutter 14 reciprocates in vertical guides 17, see Fig. 3, reciprocal movement being imparted to it by motor 13 (see Fig. 1) and the intervening belt 18, drive shaft 19 and the eccentric portions 20 thereof, and connecting rods 21. The connecting rods are connected at their opposite ends to the projecting ends 22 of the cutter. The shaft 19, connecting rods 21 and the end portion 22 of the cutter are mounted inside the hollow of the frame head 11.

A pair of brackets 25 are mounted upon base 10 at each side thereof and extend toward the rear of the machine. A roll of the sheet material 26 to be expanded is mounted upon a rod 27 which extends between the brackets 25. Feed rolls 28 and 29 and guide roll 30 are mounted rearwardly upon frame head 11. The sheet material passes from the roll 26 around guide roll 30, and between this roll and feed roll 28, and is then fed under pressure between the feed rolls 28 and 29. The feed rolls 28 and 29 are driven by motor 13 by means of the extended shaft 31, pulleys 32, belt 33, pulleys 34 and the sprocket and chain system indicated by the numeral 35.

The sheet passes forwardly from feed rolls 28 and 29 into an elongated, substantially horizontal slot 36 between a pair of guide members 37, see Fig. 3. The guide members 37 are supported in fixed position at their ends upon the frame head 11. The slot is somewhat wider at the strip-entrance end and tapers gradually toward the exit end. The forward faces of the guide members 37 are smoothly planar and the cutting blades 15 and 16 are maintained in pressure engagement with said faces during their reciprocal movement. Fig. 3 illustrates in detail the arrangement of the cutting blades. The upper and lower portions of the cutter head 14 are arranged on either side of the slot 36 and have ribs 38 projecting toward the slot, and the cutting blades 15 and 16 are clamped against these ribs by means of elongated flat clamping plates 39, the clamping plates 39 being fastened to the ribs 38 by means of bolts 40. To secure fixed attachment of the cutter blades to the clamping plates, these two may be fastened together by means of bolts 41 as shown in Fig. 3. Interior ends of bolts 41 are accommodated by recesses 42 in the ribs 38. Vertical adjustment of the cutter blades is accomplished by means of threaded adjusting bolts 43 which may be locked in position by means of nuts 44. It may be desirable to lubricate the faces of the guide members 37 against which the cutter blades press as they reciprocate, and for this purpose a recess is provided rearwardly of the face of the upper guide member and a quantity of fibrous material 45 is placed in said recess, and small openings 46 are provided extending from the recess to the face of the guide member. Ordinary lubricating oil is fed upon the fibrous material 45, and it gradually feeds to the face of the upper guide member and is distributed over the faces of both members by the cutter blades during their reciprocating motion.

The cutter blades reciprocate across the slot 36 at the exit end thereof and make transversely extending lines of incisions, or slits 47, see Figs. 1 and 4, in the strip at each reciprocating movement of the cutter. During upward movement, the lower set of blades makes a line of slits, and during downward movement, the upper set of blades makes a second line at a point slightly rearwardly of the first. The cutter blades are shaped as illustrated in Fig. 8, the projecting teeth of the opposite blades being arranged in staggered relation whereby the slits of adjacent lines are in staggered relation, as shown in Figs. 1, 4 and 6.

The sheet is drawn forwardly and downwardly at a substantial angle from the exit end of the slot 36 by means of pull roll 50, which is mounted on a pair of brackets 64 which project forwardly from base 10. The sheet is drawn between said roll 50 and an idler roll 51 which is pressed against roll 50 by means of the springs 52 which press against the roll-supporting shaft 53 at both ends thereof. Pull roll 50 is driven by motor 13 through the interposition of sprocket 54 (see Fig. 1) and chain 55 (see Fig. 2), at a speed such that the strip is drawn at a more rapid rate than it advances through the slot 36 whereby the slits are opened and the strip is expanded forming the openings 48 separated by the narrow webs 49, as shown in Figs. 1, 5 and 7. A second roll 56, which may be an idler roll or may be driven at the same speed as pull roll 50, is mounted in spaced relation to pull roll 50, and the expanded strip material 57 is wound upon a core or mandrel 58 which is supported between rolls 50 and 56. The ends of core or mandrel 58 project beyond the strip and are guided between two guide bars 59. The roll of expanded material 57 is driven by the surface of pull roll 50 and the surface speed thereof is the same as that of pull roll 50 and the size of the openings 48 is maintained constant. When expanding a fibrous sheet material possessing appreciable resilience such as paper, the material may be set in the expanded condition by moistening it. For this purpose, a water spray nozzle 60 is suitably supported on brackets 64 by means of a bar 61 and is provided with a supply conduit 62 for water and a supply conduit 63 for air under pressure. The nozzle 60 is arranged to spray a mist of moisture against the expanded sheet material as it is being accumulated on roll 57.

To insure that the slits 47 of the sheet material are all opened properly during the expansion of the strip, a gently arched rod or bar 70, see Fig. 1, is arranged against the underside of the strip at a point a short distance forwardly of the slot in such position that the strip presses against it as it passes over it. The bar 70 is supported at its ends by being fastened to the guides 17. As a means for stopping the machine in case the strip is broken, a second bar 71 is pivotally mounted at its ends upon the frame head 11 and rests upon the strip 26. A switch 72 is also mounted upon frame head 13 and is arranged in such relation to bar 71 that upon the breaking of the strip 26, the bar 71 drops and causes switch 72 to open and de-energize the motor 13. Switch 72 may be of the type described in McGall United States Patent No. 1,960,020. It is normally maintained in the closed position by internal spring pressure which causes it to close again when bar 71 is lifted from it. As illustrated in Fig. 1, it is possible to adjust the speed of feed roll 28 and pull roll 50 by moving belt 33 to the different pulleys of the pulley systems 32 and 34.

The operation of the machine is as follows. Feed rolls 28 and 29 draw the strip 26 continuously from the roll of sheet material and feed it through the slot 36 where the cutter blades 15 and 16 make lines of slits at regularly spaced intervals as the strip emerges from the slot. The strip is drawn forward at an increased rate by pull roll 50 and the slits are expanded into openings of the desired size. The bar 70 insures that all of the slits are opened at substantially the same point in the travel of the strip. There is an initial stiffness and resistance to expansion in the slitted strip which is considerably greater than the resistance to further stretching after the slits have been initially opened, whereby there is a tendency for some of the slits along the edges of the sheet to remain closed at the expense of larger openings being formed at adjacent slits. The bar 70 overcomes this difficulty and insures that all of the slits along the edges of the strip open uniformly. The difficulty just described is not encountered to an objectionable extent in the expansion of a single strip, but where multiple thicknesses of sheet material are expanded simultaneously, as will be described hereinafter, the difficulty is more pronounced and the advantage of bar 70 is distinct.

Figure 11:
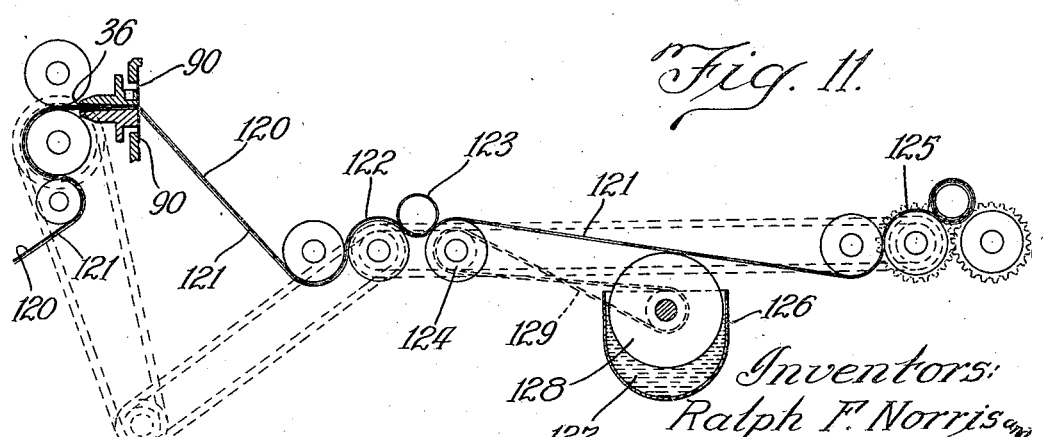
Fig. 11 is a fragmental view showing mechanism for varying the initial expansion of the sheet material and also applying a modifying treatment to the expanded material.

Pull roll 50 is shown in Fig. 2 as being driven by a sprocket 80. This sprocket is replaceable, and a number of interchangeable sprockets of different size are provided whereby roll 50 may be driven at different speeds to vary the degree of expansion of the strip. It has been found that the expansion must exceed a definite minimum in order to secure the opening of all of the slits and uniform expansion of the material. This varies with the stiffness of the sheet material, the size of the slits and the pattern of expansion. The degree of expansion which is desired varies according to the purpose for which the expanded sheet material is to be used, and where this is less than the minimum which has been mentioned heretofore, the mechanism which is illustrated in Fig. 11 may be used to obtain less expansion in the final product. This mechanism will be described hereinafter.

The expanded sheet material is allowed to accumulate on roll 57 until the said roll has acquired the desired size and then a new roll is started. The expanded material on the roll is in moistened condition from the spray of moisture which has been directed upon it, and this is allowed to evaporate until the material is substantially dry. The degree of expansion thereby becomes set and there is no tendency for it to become less when the material is unrolled and the tension is relieved. It is understood that the water spray is not used where the sheet material is metallic or of other substance upon which the moisture does not have the mentioned beneficial effect.

As mentioned heretofore, the strip 26 is pulled away from the slot and the cutting blades at an angle to the plane of the strip as it passes through the slot. This is to insure that the webs of the expanded material will be uniformly oriented. If the strip is drawn straight away in the plane in which it passes through the slot, it usually occurs that the webs in some portions of the strip are oriented in one direction, and others are oriented in the opposite direction. The reason for this is unknown, but it probably is because there is nothing to guide the webs as to the direction in which they turn when expansion takes place and as a result they turn in a haphazard manner. When the strip is drawn off at an angle as described, the machine consistently produces uniform orientation. For complete effectiveness, the angle from the plane of the sheet as it passes through the slot must be at least 43°, and it may be any angle greater than this at which it is practicable to draw the strip forward, the maximum angle being 90°. Figs. 4 and 5 illustrate a portion of the sheet material 27 in the slitted and in the expanded condition, respectively, when a pattern of substantially diamond-shaped openings 48 is being made. In this pattern the adjacent lines of slits are arranged so that the unslitted portion between two slits in one line is opposite the mid-portion of a slit in the next line. Figs. 6 and 7 illustrate a different pattern of expansion, in which one end of the openings 86 is pointed and the opposite end is substantially flat. This pattern is obtained by arranging the slits 87, see Fig. 6, so that the unslitted sections between the slits of one line occur opposite a point nearer one end than the other of the slits of the next line. Such pattern is desirable for certain purposes, such as where pads of this material are made up of a plurality of superposed layers of the expanded sheet material and it is desired that the openings of adjacent layers be out of register with one another. In this situation the alternate layers are arranged so that the pointed ends of the openings extend in opposite directions.

Variation of the pattern of expansion may be obtained by adjusting the position of one set of cutter blades with respect to the other set. Fig. 8 illustrates a portion of a cutter blade 15 showing the means for adjusting its position. The blade has pointed teeth 88, the edges of which proceed uniformly at an angle from the base to the apex. Rectangular openings 89, preferably with rounded corners, are provided for the bolts 41 to pass through, see Fig. 3. The openings 89 are substantially larger than the diameter of the bolts 41 whereby the blade 15 may be shifted both laterally and vertically. The lateral shifting of the blade changes the pattern in the manner described in connection with Figs. 4, 5, 6 and 7. The vertical shifting of the blade varies the depth to which the same penetrates through the sheet material and hence varies the length of the slits and the distance between slits of the same row. This varies the pattern of expansion.

Fig. 9 illustrates a modified form of blade 90 having pointed teeth 91 which have shank portions 92, the edges 93 of which project perpendicularly forward from the base 94, and cutting portions extending uniformly at an angle from the shank to the apex. Such a blade is adapted particularly for slitting a number of thicknesses of sheet material simultaneously and producing slits of the same length and arrangement in all of the thicknesses.

Figure 10:
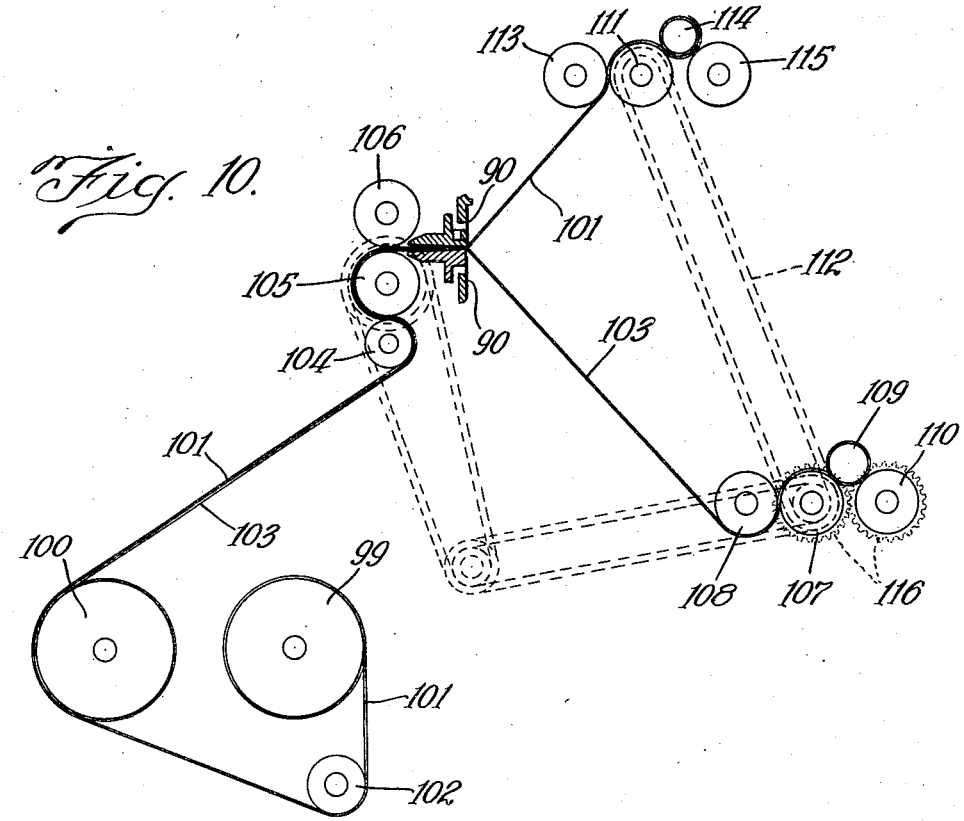
Fig. 10 is a diagrammatic view illustrating an arrangement of the mechanism for expanding two strips of sheet material simultaneously.

Fig. 10 illustrates diagrammatically an arrangement of the expanding machine for expanding a number of strips of sheet material simultaneously. Two supply rolls 99 and 100 of the sheet material are arranged to feed into the mechanism, one strip 101 passing from supply roll 99 around an idling roll 102 and over the second supply roll 100 which supplies the second strip 103, the two strips being fed together around guide roll 104 and between feed rolls 105 and 106 and to the slot 36. At the exit end of the slot 36 the cutter blades 90 make the transverse lines of slits at regular intervals as the strips advance. The strip 103 is drawn downwardly and expanded by means of pull roll 107, passing between the said pull roll and idler roll 108 and thence being wound up in a roll of finished expanded material 109 between pull roll 107 and a cooperating roll 110. Roll 110 is shown as being driven positively by means of gears 116.

The other strip 101 is drawn upwardly at an angle from the slot 36 and is expanded by means of pull roll 111, the latter being driven by a sprocket and chain arrangement indicated by the numeral 112 leading from pull roll 107. The strip 101 of expanded material is maintained in firm engagement with pull roll 111 by means of idler roll 113 and the roll of finished expanded material 114 is carried between pull roll 111 and cooperating roll 115. More than two strips of sheet material may be expanded in this mechanism, since it is possible for several strips to follow the path of each of the strips 101 and 103 and be subjected to the same operations. An additional supply roll may be provided for each additional strip to be expanded. The slot 36 may be made sufficiently wide to accommodate the thicknesses of material being operated upon. It is obvious that the expansion of sheet 101 may be the same or different from that of sheet 103 by causing pull rolls 107 and 111 to operate at suitable rates.

Fig. 11, a mechanism is illustrated which is adapted for expanding several sheets simultaneously and producing different degrees of expansion in each, and imparting a liquid treatment to one of the strips. Two strips 120 and 121 are fed together through the slot 36 and are slitted by blades 90, and are expanded together by means of pull roll 122. The sheet 120 is rolled up in final expanded condition at 123 between pull roll 122 and a cooperating roll 124. It may be subjected to a moisture spray similar to that described heretofore. The other strip 121 proceeds from pull roll 122 and is drawn by a second pull roll 125. The expansion of the two strips is the same as they pass over pull roll 122, but the expansion of strip 121 may be varied by pull roll 125 to be either greater or less than that of strip 120. As has been explained heretofore, a decrease of expansion is of particular benefit where an initial minimum expansion is necessary in order to secure the proper opening of all of the slits, which initial expansion is greater than that desired in the final product. However, this mechanism is also of practical utility in making the expansion of strip 121 greater than that of strip 120, because difficulty is often encountered when it is attempted to expand the material more than a certain maximum directly as it leaves the cutting blades. The reason for this is not known definitely, but it is believed to be because the strip moves continuously at a uniform velocity into the slot, and during the instant that the slits are being made by the blades 90 the forward motion of the strip is arrested by the blades. As a consequence, if pull roll 122 is advancing the strip at a high rate, excessive tension may be placed upon the material at the cutter blades and a tearing occurs between the slits, causing the webs between openings to be severed, with the result that occasional large holes occur in the expanded material. For this reason, where a high degree of expansion is desired, it is advisable to give an initial expansion of a moderate degree directly as the strip leaves the cutting blades, and to increase the expansion by means of the second pull roll 125 to the final degree desired.

The mechanism for treating strip 121 with a liquid substance comprises a trough-shaped container 126 disposed below and crosswise of the said strip. The treating liquid 127 partially fills the container 126, and a roll 128 having a surface adapted to pick up the treating liquid is supported in such relation that its lower portion dips into the liquid and its upper surface makes contact with strip 121. The roll 128 is driven by means of a suitable chain or belt 129 in a direction such that the engaging surfaces of the roll and strip 121 travel in opposite directions. A uniform quantity of treating liquid is transferred from the container 126 to the strip 121. The webs of strip 121 scrape the treating liquid from the roll 128. In the case of fibrous sheet materials the liquid may be absorbed at least partially, into the material. The treating liquid may be any substance which is capable of imparting desirable characteristics to the expanded material. For example, it may be a fireproofing composition, such as an aqueous solution of ammonium phosphate.

While but one specific embodiment of the sheet slitting portion of the machine is described and illustrated, modifications therein may be made.

We claim:

1. The method of making expanded paper which comprises advancing a strip of paper at a predetermined rate while supporting it laterally, progressively forming lines of transverse slits in said strip at regular longitudinally spaced intervals as said strip advances, the slits of each line being spaced apart in end-to-end relation, the slits of each succeeding line being staggered with respect to those of the last, each succeeding line of slits being cut from opposite sides of said strip, drawing forward the slitted portion of said strip at a rate more rapid than said predetermined rate of advance and at a substantial angle to the plane of the unslitted portion immediately rearward of the point of forming the slits to expand the slit-openings, and moistening said sheet and allowing said sheet to dry while in said expanded condition.

2. The method of making expanded fibrous sheet material which comprises advancing a strip of said material at a predetermined rate while supporting it laterally, progressively cutting lines of transverse slits in said strip as said strip advances, the slits of each line being spaced apart in end-to-end relation and the slits in each succeeding line being staggered with respect to those of the last, drawing forward the slitted portion of said strip at an initial rate more rapid than said predetermined rate of advance to expand said strip and thence drawing forward the expanded portion of said strip at a rate different from said initial rate to change the opening size of said expanded portion, and moistening and drying said expanded sheet material to set it in the expanded condition.

3. The method of making expanded sheet material which comprises advancing a plurality of strips of said sheet material at a predetermined rate while supporting said strips laterally at a substantially fixed point, progressively cutting lines of transverse slits in said strips as said strips pass said point, the slits of each line being spaced apart in end-to-end relation and the slits of each succeeding line being staggered with respect to those of the last, drawing forward the slitted portions of said strips at a rate more rapid than said predetermined rate of advance and at a substantial angle to the plane of the unslitted portions of said strips immediately rearward of said point of cutting.

4. The method of making expanded sheet material which comprises advancing a strip of said material at a predetermined rate while supporting it laterally, progressively cutting lines of transverse slits in said strip alternately from opposite sides of said strip as said strip advances, the slits of each line being spaced apart in end-to-end relation and the slits in each succeeding line being staggered with respect to those of the last, drawing forward the slitted portion of said strip at a rate more rapid than said predetermined rate of advance and at a substantial angle to the plane of the unslitted portion of said strip immediately rearward of the point of cutting.

5. The method of making expanded sheet material which comprises advancing a strip of said material at a predetermined rate while supporting it laterally, progressively cutting lines of transverse slits in said strip at regular longitudinally spaced intervals as said strip advances, the slits of each line being spaced apart in end-to-end relation and the slits in each succeeding line being staggered with respect to those of the last, drawing forward the slitted portion of said strip at a rate more rapid than said predetermined rate of advance and at a substantial angle to the plane of the unslitted portion of said strip immediately rearward of said point of cutting.

6. The method of making expanded moisture-absorbent sheet material which comprises advancing a strip of said material at a predetermined rate while supporting it laterally, progressively cutting lines of transverse slits in said strip, drawing forward the slitted portion of said strip at a rate more rapid than said predetermined rate of advance to open said slits and expand said sheet material, and treating said expanded sheet material to set it in the expanded condition.

7. A machine for making expanded sheet material comprising means for advancing an elongated strip of said sheet material, means for adjusting the rate of advance of said strip, a strip-guiding member having a slot therein through which said strip may pass and be supported laterally, a pair of cutter blades adapted to reciprocate across said slot and in contact with the forward face of said guide member to cut lines of transverse slits into said strip, said blades being arranged in opposed relation and each comprising a row of spaced-apart teeth, the individual teeth of one blade being in staggered relation to those of the other, means for drawing said strip forwardly at an initial rate more rapid than the rate of advance to said slot and at a substantial angle to the plane of said strip as it passes to said slot, whereby said strip is expanded, a second strip drawing means located in advance of said first strip drawing means and adapted to draw said strip forwardly at a rate different from said initial rate of advance.

8. A machine for making expanded sheet material comprising strip-guiding means having a slot through which a strip of said sheet material may be advanced, means for advancing said strip at a predetermined rate to said slot, a pair of cutter blades adapted to reciprocate across the forward end of said slot and make a line of spaced-apart transverse slits in said strip at each reciprocating movement, said blades being arranged in opposed relation to each other, the individual teeth of one blade being arranged in staggered relation to those of the other, means for drawing the slitted strip forwardly at a rate more rapid than said predetermined rate of advance and at a substantial angle to the plane of said strip as it passes through said slot, means for moistening said strip material after it has passed through said drawing means, and means for maintaining said strip material in expanded condition while said moisture evaporates therefrom.

9. A machine for making expanded sheet material comprising strip-guiding means past which a strip of said sheet material may be advanced, means for advancing said strip at a predetermined rate past said guiding means, a pair of cutter blades adapted to reciprocate crosswise of the forward end of said guiding means and make a line of spaced-apart transverse slits in said strip at each reciprocating movement, said blades being arranged in opposed relation to each other, the individual teeth of one blade being arranged in staggered relation to those of the other, and means for drawing the slitted strip forwardly at a rate more rapid than said predetermined rate of advance and at a substantial angle to the plane of said strip as it passes said guiding means.

10. The sheet expanding means of claim 9 in which the lateral position of at least one of the cutter blades is adjustable whereby the staggered relation of the teeth of the different blades is variable.

11. The sheet expanding means of claim 9 in which the strip-guiding member is adapted to accommodate a number of thicknesses of the sheet material whereby a number of strips may be operated upon simultaneously by said sheet expanding means.

12. The sheet expanding means of claim 9 in which means are provided for treating the expanded sheet material with a liquid substance having a modifying effect upon the properties of said expanded sheet material.

13. The sheet expanding machine of claim 9 in which the rate of operation of the slitted strip drawing means is adjustable.

14. A machine for making expanded sheet material comprising strip-guiding means past which a strip of said sheet material may be advanced, means for advancing said strip at a predetermined rate past said guiding means, a pair of cutter blades adapted to reciprocate crosswise of the forward end of said guiding means and make a line of spaced-apart transverse slits in said strip at each reciprocating movement, said blades being arranged in opposed relation to each other, the individual teeth of one blade being arranged in staggered relation to those of the other, and means for drawing the slitted strip forwardly at a rate more rapid than said predetermined rate of advance.

15. Means for expanding sheet material comprising means for advancing said sheet material, means for guiding said sheet material, said guiding means having a slot through which said sheet material may pass and be supported laterally, means for cutting lines of transverse slits into said sheet material as it passes through said slot, and means for drawing said slitted sheet material forwardly from said slitting means at a rate more rapid than the rate of advance to said slot and at a substantial angle to the plane of said sheet as it passes through said slot.

16. A machine for making slitted sheet material comprising means for guiding a strip of said sheet material, said strip-guiding means having a slot through which a strip of said material may pass, means for advancing said strip through said slot, and a cutter blade adapted to reciprocate across said slot and make a line of spaced-apart slits in said strip at each reciprocating movement.

17. A machine for making slitted sheet material comprising strip-guiding means having a slot through which a strip of said sheet material may be advanced, means for advancing said strip at a predetermined rate to said slot and a pair of cutter blades adapted to reciprocate across the forward end of said slot and make a line of spaced-apart transverse slits in said strip at each reciprocating movement, said blades being arranged in opposed relation to each other, the individual teeth of one blade being arranged in staggered relation to those of the other.

18. Means for expanding sheet material comprising means for advancing a plurality of strips of said sheet material simultaneously, a strip-guiding member having a slot therein through which said strips of material may pass and be supported laterally, a pair of cutters adapted to reciprocate across said slot at the forward surface of said guiding member to cut lines of transverse slits into said strips, said cutters being arranged in opposed relation and each comprising a plurality of teeth in end-to-end relation, the individual teeth of one cutter being arranged in staggered relation to those of the other, and a pair of sheet drawing means located forwardly of said cutters, each of said sheet drawing means being adapted to draw one or more of said strips forwardly at a rate greater than the rate at which said strips are advanced to said slot whereby said strips are expanded by said drawing means, each of said drawing means being located at a substantial angle from the plane of said strips as they pass to said slot.

19. The method of making expanded fibrous sheet material which comprises advancing a sheet of said material at a predetermined rate past a stationary guide, progressively cutting lines of transverse slits in said sheet adjacent said guide, drawing forward the slitted portion of said sheet at a rate more rapid than said predetermined rate of advance to expand said sheet material, and treating said sheet material to set it in the expanded condition.

20. The method of forming expanded moisture-absorbent sheet material which comprises slitting said sheet material, elongating said sheet material transversely of the slits so formed to expand said sheet material, and moistening and drying said expanded sheet material to set it in the expanded condition.

21. The method of expanding slitted, moisture-absorbent sheet material which comprises elongating said sheet material transversely of the slits to expand said sheet material, and moistening and drying said expanded sheet material to set it in expanded condition.

22. The method of making expanded fibrous sheet material which comprises advancing a strip of fibrous sheet material at a predetermined rate while supporting it laterally, progressively cutting lines of slits extending transversely of said strip, the individual slits of each line of slits overlapping the mutually adjacent end portions of the two adjacent slits in the succeeding line of slits, each said individual slit overlapping a substantially greater portion of one of said adjacent slits than of the other, whereby when said slits are expanded to form openings the webs meeting at one end of each opening are substantially at right angles to each other, and drawing forward the slitted portion of said strip at a rate more rapid than said predetermined rate of advance to expand said slits.

23. Apparatus for making slitted sheet material comprising stationary top and bottom guide members between which at least one strip of sheet material may be advanced, means for advancing said strip between said guide members, a pair of top and bottom cutter blades adapted to reciprocate transversely of said guide members and pierce two lines of spaced apart slits in said strip at each reciprocating cycle thereof, said guide members having edges adapted to hold said strip against the forces exerted thereon by said cutter blades.

RALPH F. NORRIS.
GEORGE H. NELSON.